June 1, 1965 O. STEINMETZ 3,187,106
TELEPHONE RING-TRIP ARRANGEMENT
Filed July 19, 1961
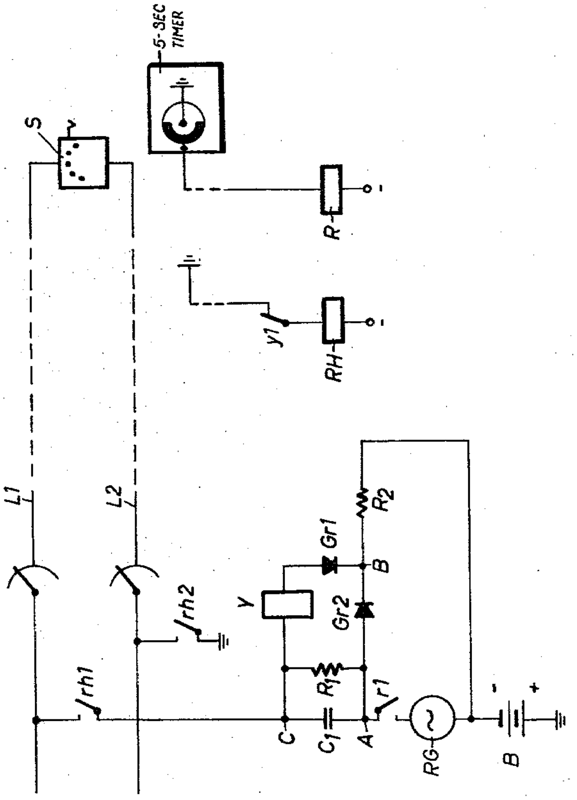
INVENTOR
Otto Steinmetz
BY Paul W. Hemminger
ATTORNEY United States Patent Office 3,187,106

Patented June 1, 1965

3,187,106

TELEPHONE RING-TRIP ARRANGEMENT

Otto Steinmetz, Neunkirchen (Saar), Germany, assignor to International Standard Electric Corporation, New York, N.Y., a corporation of Delaware Filed July 19, 1961, Ser. No. 125,231
Claims priority, application Germany, July 21, 1960, St 16,703
3 Claims. (Cl. 179—18)

The invention refers to a circuit arrangement for cutting off the ringing current in telephone equipment when a subscriber answers, the ringing voltage in such equipment being connected in case of a call in series with the equipment's supply voltage across a tripping device to one wire of the subscriber's line, while the other wire is grounded.

In order to keep the ringing current from reaching the subscriber's receiver when he is holding his handset in proper call position, the ringing voltage must be quickly cut off as soon as the subscriber answers. This is particularly important when a subscriber answers at the start of the ringing signal, which lasts about one second. For this reason, a tripping device is included in the ringing circuit so that the ringing signal can start to be switched off when a subscriber answers during such signal.

With the subscriber station in normal position, the ringing circuit is closed across the subscriber stations' circuit. When a subscriber lifts his handset, D.C. can flow through the subscriber station. In a well-known circuit arrangement these two operating conditions are monitored and used accordingly to send or to switch off the ringing voltage.

In prior art arrangements, the ringing circuit superimposed on the equipment's supply voltage is closed across the subscriber's line and includes a relay having an attenuating winding. Since there is no D.C. path in the subscriber station in normal position, only a ringing voltage drop can develop at that relay when a ringing signal is sent. The attenuating windings are designed to render the relay so slow-acting that it cannot respond to half cycles of the ringing voltage. In the next half cycle, the energization occurs in the opposite direction, so that the relay stays released. When the subscriber answers (D.C. path closed) the voltage conditions at the relay change in such a way that the energization in one direction of current predominates to a marked degree and the relay therefore responds. The drawback to this prior-art circuit arrangement is that when the subsciber station is in normal position, the relay is alternately energized with each ringing signal and under certain conditions can lead to a false indicator signal if the response retardation has not been chosen long enough. As already mentioned, this latter is not a desirable feature, either.

The object of the invention is to eliminate the noted retardation drawback and to provide a circuit arrangement for cutting off the ringing circuit immediately when a subscriber answers during a non-ringing period and to also cut off the ringing circuit immediately when the subscriber answers during a ringing period, both of these cut offs being with minimum retardation. This is accomplished by the circuit arrangement in accordance with the invention in that the tripping device is connected in series to two opposing rectifiers, in that this series-connected circuit is connected in parallel to a parallel circuit of a condenser and a resistance included in the ringing circuit and in that the two rectifiers are connected by their cathodes and this connection point is applied across another resistance to the equipment's supply voltage. In order to make sure that the tripping device remains unoperated during the ringing signal, when the subscriber station is in normal position, the condenser-resistance parallel circuit included in the ringing circuit is so dimensioned that the potential at the parallel circuit's point diverted from the ringing voltage changes approximately in phase with the potential at the ringing voltage generator. The above-mentioned components comprise a circuit hereinafter termed the tripping circuit.

The operation of the circuit arrangements in accordance with the invention will now be described with reference to the accompanying drawing which shows a called station and associated ringing equipment connected to the line serving the called station. In ringing position, that is, during the ringing phases and the pauses between them, relay R*h* is constantly energized.

A relay R is actuated at a five-second rate, for example, to send the ringing signals. When that relay's contact is closed, the ringing circuit is operative. Its path is: Ground, supply source B, ringing voltage generator RG, contact *r*1, the tripping circuit, contact *rh*1, line conductor L1, subscriber station S with separating capacitor and ringer, line conductor L2, contact *rh*2 and ground. When the ringing signals are sent, the potential proportions at the tripping circuit are as follows:

In the ringing half cycle during which the ringing voltage is smaller than the voltage of supply source B, rectifier G*r*2 is conductive, and the potential of points A and B is about the same. At point C, however, the potential is more positive as a result of the voltage drop occurring at the parallel connection of condenser $C_1$ and resistance $R_1$, so that rectifier G*r*1 is blocked. Thus, no current flows across tripping device Y.

In the half cycle with increased ringing voltage in the ringing circuit, rectifier G*r*2 is blocked since point B is at the minus potential of supply source B and point A is positive. Point A of the tripping device is always more negative than point C and point C stays more negative than point B. Thus, rectifier G*r*1 remains blocked during this half cycle also. Thus, tripping device Y remains unoperated during the entire time of the signal when the subscriber station is in normal position.

If the D.C.-loop is closed during the ringing signal, the potential ratios shift, since the subscriber station has now assumed a substantially smaller resistance value and the voltage drop across the tripping circuit accordingly increases. During the half cycle in which the ringing voltage in the ringing circuit is reduced, rectifier G*r*2 is conductive and point C is close to ground potential at the start of the half cycle, so that point C is negative with respect to point B and rectifier G*r*1 conducts and current flows through tripping device Y, operating it. This current remains substantially constant during the entire half cycle, since the ringing voltage drop on the subscriber line lowers the ringing voltage in that circuit.

Rectifier G*r*2 is blocked during the other half cycle. The D.C. path across tripping device Y, rectifier G*r*1 and resistance $R_2$, however, is maintained and relay Y remains operated. The voltage drop on the subscriber line is increased by the additional ringing current for the circuit of tripping device Y and, depending on the design of the circuit arrangement, can even reach a point where an interruption of current occurs for a short time in the tripping circuit. However, the tripping action will definitely start within a cycle of the ringing A.C. voltage. When device Y operates contacts thereon disconnect the ringing circuit from the answering line.

While I have described my invention in connection with specific apparatus, it is to be clearly understood that this description is made only by way of example and not as a limitation to the scope of the claims.

What is claimed is:

1. A circuit arrangement for controlling the application and removal of alternating current ringing signals to and from a telephone line and called station thereon, trip means comprising a relay winding and associated current conductive bypass means, means for applying a direct current to said line through said trip means, means for periodically applying alternating current superimposed on said direct current to said line through said trip means, and blocking means associated with said trip means, said blocking means excluding direct current flow and superimposed alternating current flow through said relay winding and allowing said direct current flow and alternating current flow through said bypass means when said station is unanswered, said blocking means permitting direct current flow and superimposed alternating current flow through said relay winding when said station is answered, said blocking means including a uni-directional current device which is back-biased against current flow therethrough when said called station is in an unanswered condition and which is forward-biased to permit current flow therethrough when said called station is in an answered condition.

2. A circuit arrangement as set forth in claim 1 wherein a second unidirectional current device is provided which applies direct current to said line to back-bias the said first unidirectional current device during the intervals said superimposed alternating current is not applied to said line.

3. A circuit arrangement for controlling the application and removal of alternating current ringing signals to and from a telephone line and called station thereon, trip means comprising a relay winding and associated current conductive bypass means, means for applying a direct current to said line through said trip means, means for periodically applying alternating current superimposed on said direct current to said line through said trip means, and blocking means associated with said trip means, said blocking means excluding direct current flow and superimposed alternating current flow through said relay winding and allowing said direct current flow and alternating current flow through said bypass means when said station is unanswered, said blocking means permitting direct current flow and superimposed alternating current flow through said relay winding when said station is answered, said bypass means including a paralleled resistance-capacitance network.

References Cited by the Examiner

UNITED STATES PATENTS

| | | | |
|---|---|---|---|
| 2,189,769 | 2/40 | Johnston et al. | 179—18 |
| 2,421,148 | 5/47 | Hadfield | 179—18 |
| 2,954,438 | 9/60 | Bray | 179—18 |

ROBERT H. ROSE, *Primary Examiner.*

WILLIAM C. COOPER, *Examiner.*